(12) United States Patent
Karoliussen

(10) Patent No.: US 8,056,208 B2
(45) Date of Patent: Nov. 15, 2011

(54) METHOD FOR COLD JOINING A COUPLING ELEMENT TO A PIPE

(75) Inventor: Hilberg Karoliussen, Risør (NO)

(73) Assignee: Quickflange AS, Tvedestrand (NO)

( * ) Notice: Subject to any disclaimer, the term of this patent is extended or adjusted under 35 U.S.C. 154(b) by 1366 days.

(21) Appl. No.: 10/599,162

(22) PCT Filed: Mar. 18, 2005

(86) PCT No.: PCT/NO2005/000093
§ 371 (c)(1),
(2), (4) Date: Sep. 21, 2006

(87) PCT Pub. No.: WO2005/089975
PCT Pub. Date: Sep. 29, 2005

(65) Prior Publication Data
US 2007/0199190 A1    Aug. 30, 2007

(30) Foreign Application Priority Data
Mar. 24, 2004  (NO) .................................. 20041215

(51) Int. Cl.
*B21D 39/00* (2006.01)
(52) U.S. Cl. ......... 29/523; 29/282; 29/522.1; 285/382.4
(58) Field of Classification Search .................. 29/243, 29/518, 282, 522.1, 523, 525; 285/258, 382.4
See application file for complete search history.

(56) References Cited

U.S. PATENT DOCUMENTS

| | | | |
|---|---|---|---|
| 2,252,274 A | 8/1941 | Rossheim et al. | |
| 3,575,447 A * | 4/1971 | Merkle | 285/258 |
| 3,730,567 A | 5/1973 | Webster | |
| 4,147,385 A | 4/1979 | Van Der Velden | |
| 4,154,464 A | 5/1979 | Stary | |
| 4,593,448 A | 6/1986 | Aggradi et al. | |
| 4,934,038 A | 6/1990 | Caudill | |
| 5,335,729 A * | 8/1994 | Turner et al. | 285/382 |
| 6,517,126 B1 | 2/2003 | Peterson | |

FOREIGN PATENT DOCUMENTS

| | | |
|---|---|---|
| AU | B-77373/91 | 1/1990 |
| DE | 27 24 257 | 12/1977 |
| DE | OS 2724257 | 12/1977 |
| DE | OS 3144385 | 5/1983 |
| EP | 0 570 178 A1 | 11/1993 |
| GB | 841869 | 7/1960 |
| JP | 33004410 | 6/1933 |
| JP | 56030689 | 3/1981 |
| JP | 56083684 | 7/1981 |
| JP | 56131026 | 10/1981 |
| JP | 61063330 | 4/1986 |
| JP | 61133229 | 8/1986 |
| JP | 10318452 | 12/1998 |
| RU | 2159689 | 11/2000 |

* cited by examiner

*Primary Examiner* — Donghai D. Nguyen

(74) *Attorney, Agent, or Firm* — Rodman & Rodman

(57) ABSTRACT

A method for joining flanges or other couplings to pipes, wherein a plurality of radially expanding segments (10) with circular ridges (11) on a tool inserted into the pipe (1), press beads (5, 6) in the pipe wall into corresponding grooves (3, 4) in the surrounding coupling element (2), where the pipe end, by means of a projection on the segments, is given an overbending outwards that prevents the pipe end from tapering inwards during the pressing of the beads. The invention comprises the interior configuration of the coupling element as well as a tool for pressing the beads.

1 Claim, 10 Drawing Sheets

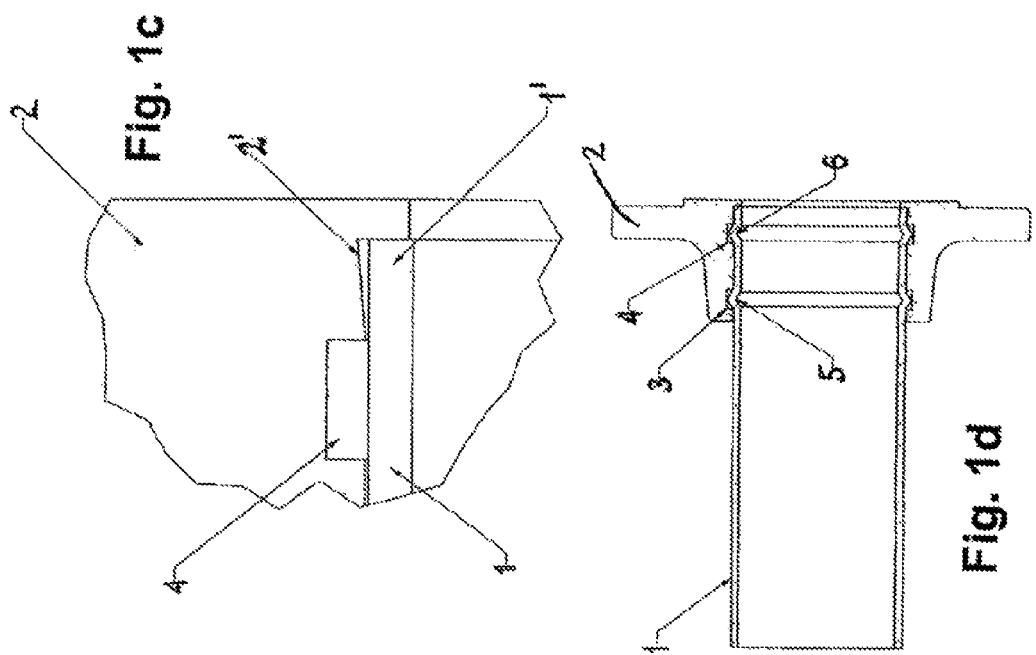
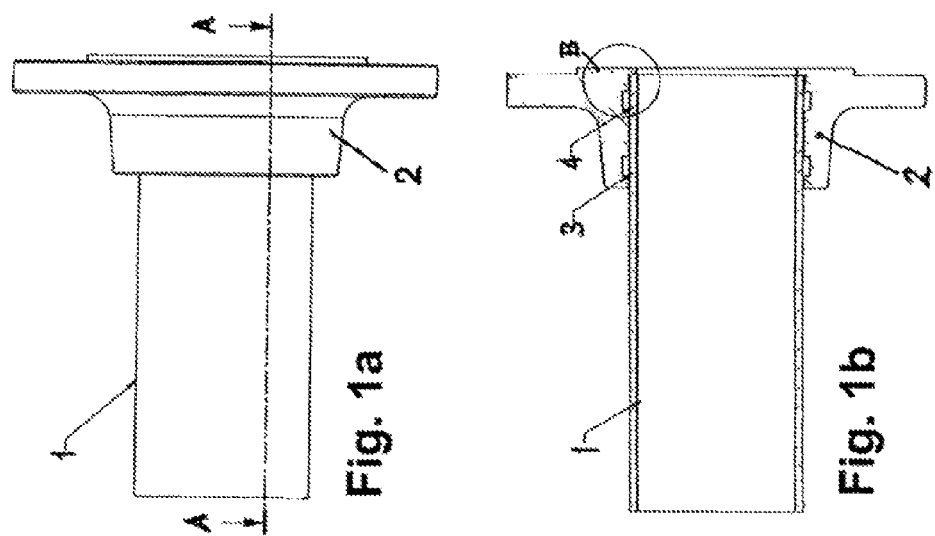

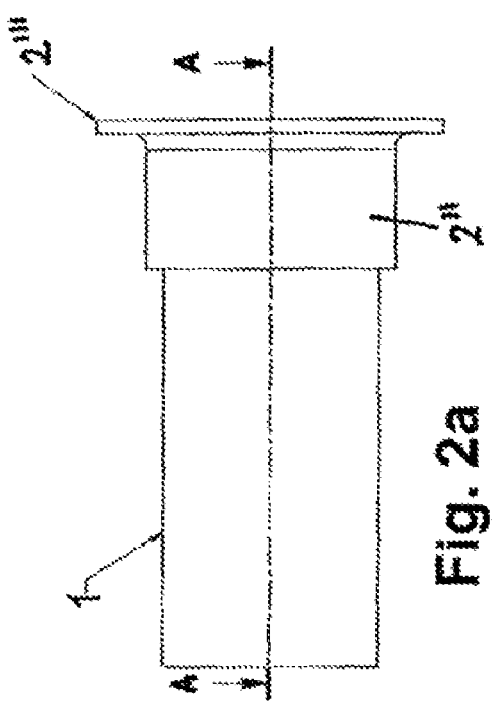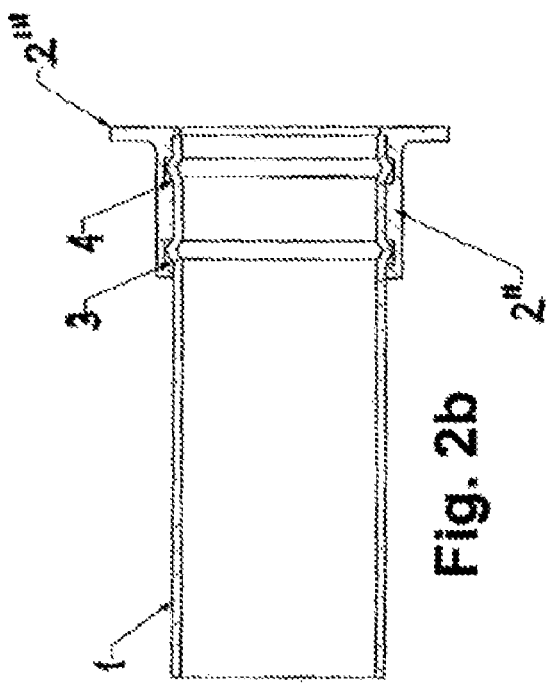

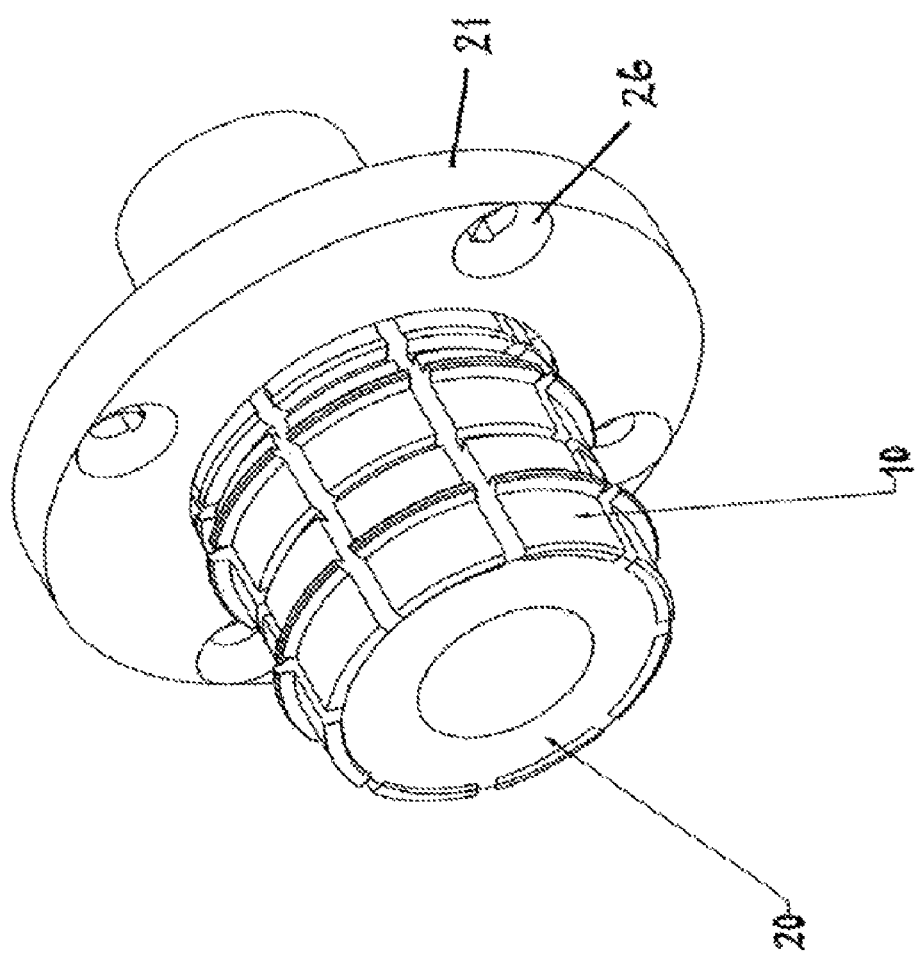

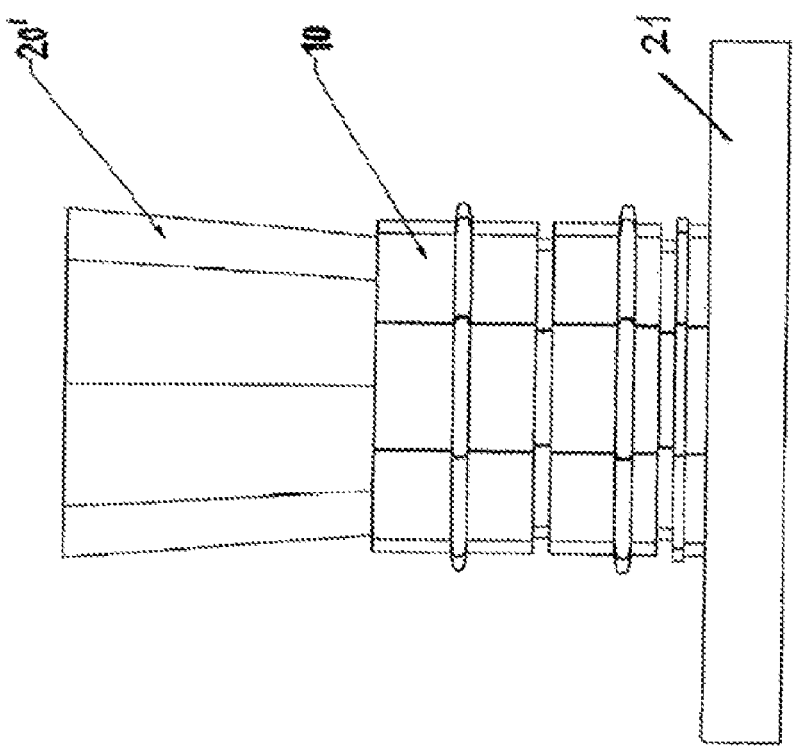

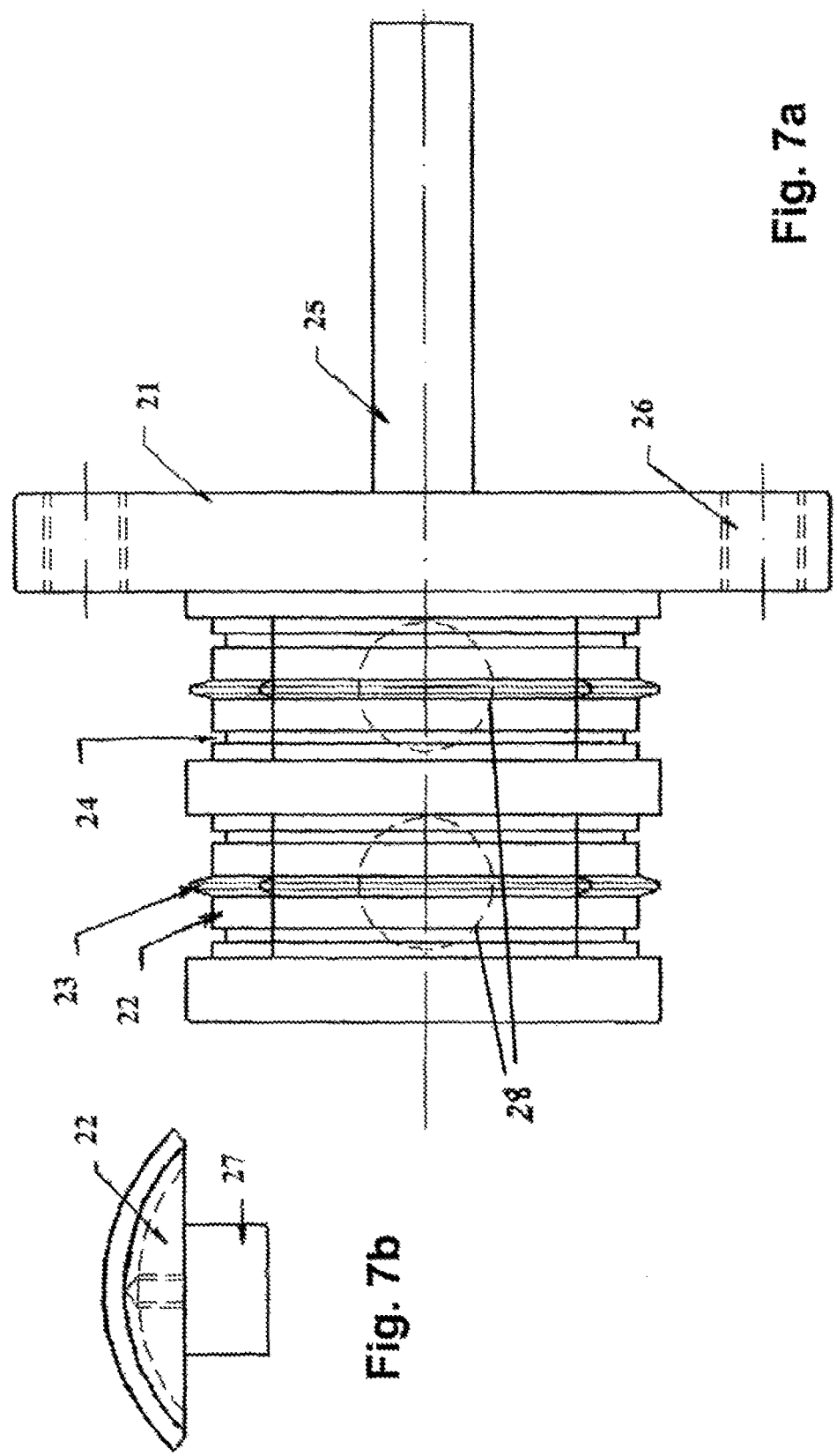

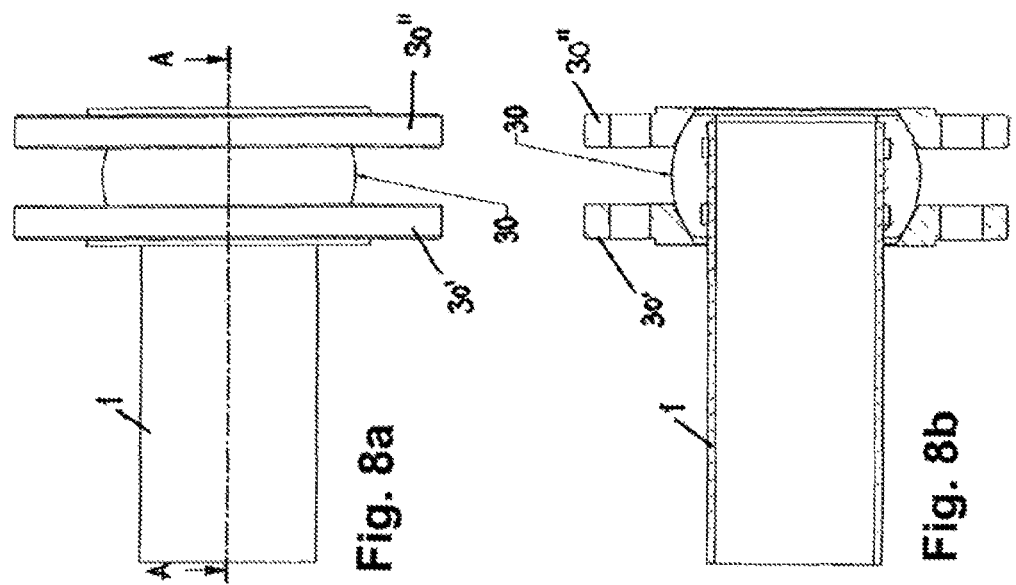

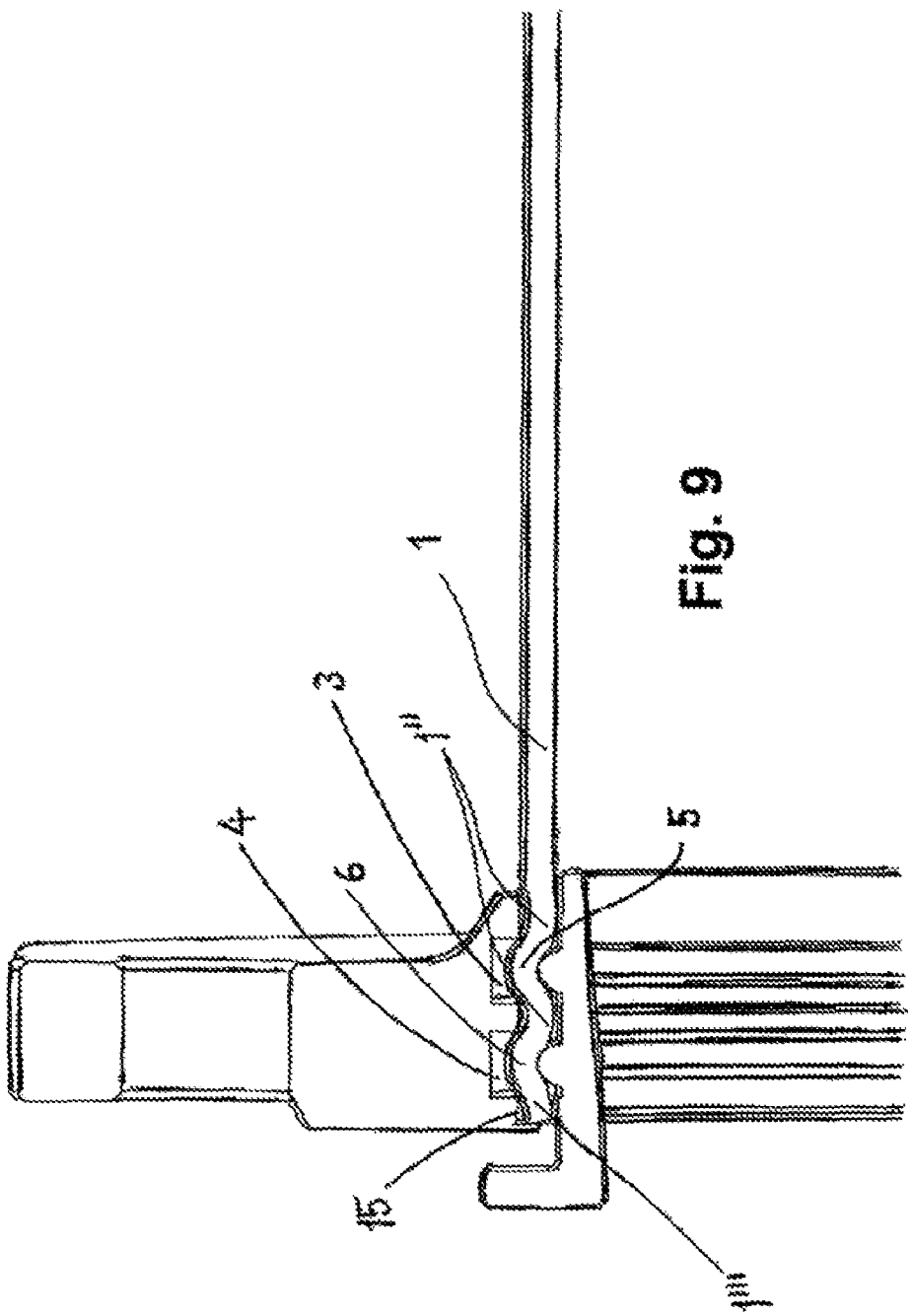

(12) United States Patent
US 8,056,208 B2

METHOD FOR COLD JOINING A COUPLING ELEMENT TO A PIPE

BACKGROUND OF THE INVENTION

The invention relates to a method and a tool for joining a coupling element, for example, a joining flange means, to a pipe, said coupling element surrounding the pipe and having grooves facing the pipe and intended to receive a corresponding plurality of beads provided on the pipe and a coupling element connectable to a pipe, said coupling element configured to surround the pipe and having grooves to face the pipe and to receive a corresponding plurality of beads provided on the pipe.

FIELD OF THE INVENTION

Flanges of many types and varieties are used extensively in industry when pipe-to-pipe or pipe-to-other component connections are to be provided. The welding of flanges to pipes is the most common method in the case of steel pipes and standard weldable metals, whilst, for example, screw flanges are used in connection with, for instance, galvanised pipes.

DESCRIPTION OF RELATED ART

In recent years a number of methods have been developed for the fastening of coupling elements and the joining of pipes by deforming the pipe inside the coupling so as to secure it. Other methods and equipment which clamp the coupling to the outside of the pipe without any or with little deformation of the pipe have also been developed. Examples of such methods are taught in U.S. Pat. No. 4,593,448 and U.S. Pat. No. 4,147,385. DE 27 24 257 and U.S. Pat. No. 2,252,274 teach tools with rollers which by means of a rotating cone in the centre with rollers therearound will deform the pipe so that it fits into grooves in the coupling elements. DE 3144385 teaches a joining system for pipes where radially movable ridges, with the aid of hydraulic pressure against underlying pistons, press in beads. However, as discussed further below, the pipe wall on the side of the beads will buckle inwards, and when the ridges of the tool are retracted, the actual bead in the pipe will also retract somewhat, which makes the connection weak. In addition, there will be a metal-to-metal seal between pipe and coupling element, and therefore the system taught in the said document will require sealing material in the grooves of the coupling element. It has been found that with radial pistons as taught in DE 3144385 it is not possible to obtain an especially large radial force, and this principle could perhaps be used with particularly thin-walled pipes.

To deform a pipe wall into grooves in a surrounding coupling element requires very large forces if the pipe wall is to be pressed radially outwards. The use of rollers as described in DE 27 24 257 and U.S. Pat. No. 2,252,274 means that less radial force is required, but on the other hand the tool must be secured to the pipe and therefore becomes large and heavy. Rolling subjects the material to harsher treatment and also takes longer than radial pressing.

BRIEF SUMMARY OF THE INVENTION

The object of the invention is to provide for joining flanges or other coupling elements to pipes where a tool is only operated radially so that a fixing of the pipe is not necessary. Furthermore, it is an object to obtain a tool which even in connection with small pipe dimensions has enough force to deform beads in relatively thick pipe walls. It is also an object that the tool should function so that inward tapering of the pipe end, which has been found to be a problem in connection with the radial pressing of beads is avoided.

BRIEF DESCRIPTION OF THE DRAWINGS

In the drawings,

FIG. 1a is a side view of a pipe and a coupling.
FIG. 1b is a section A-A of FIG. 1a without beads created on the pipe.
FIG. 1c is, an enlargement of encircled region B in FIG. 1b.
FIG. 1d is a modified section A-A of FIG. 1a with beads created on the pipe.
FIG. 2a shows a modified coupling element with inserted pipe.
FIG. 2b shows a section A-A of FIG. 2a.
FIG. 3b shows a section A-A through the assembly of pipe, coupling element and tool part of FIG. 3a.
FIG. 4b is a section A-A of FIG. 4a.
FIG. 5b is a perspective view of the tool from a second angle.
FIG. 6 is a side view of the tool.
FIG. 7a is a side view of a modified tool with a hydraulic force amplifier,
and FIG. 7b is a functional expansion acting element of the tool.
FIG. 8a is a side view of a pipe with a modified coupling element structure,
and FIG. 8b is a section A-A through the embodiment of FIG. 8a.
FIG. 9 illustrates final adjustments of an established coupling.

DETAILED DESCRIPTION OF THE INVENTION

Figure 3A:
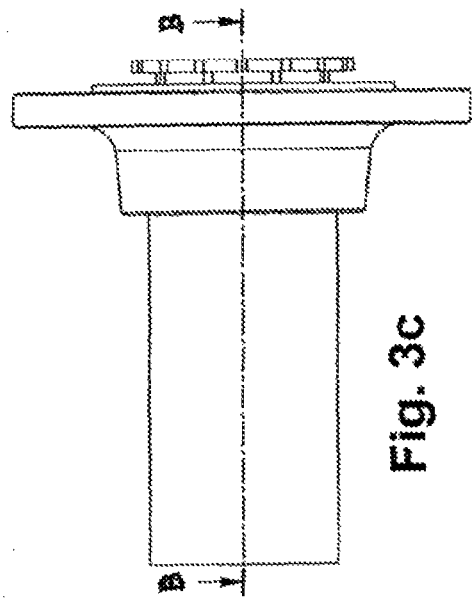
FIG. 3a shows a side view of a pipe, a coupling element and an inserted tool in a first operational stage prior to coupling operation.

The invention is now to be described in further detail with reference to the attached drawing figures.

FIGS. 1a-1c show a pipe 1 and a coupling element 2 before beads 5, 6 are created. FIG. 1d shows the same after the beads 5, 6 created on the pipe 1 have been pressed into recesses 3, 4, respectively in the coupling element 2.

FIGS. 2a and 2b show a coupling element 2' fitted onto a pipe 1 and with beads 5, 6 pressed into place into recesses in the coupling element 2", the coupling element having a flange 2''' for attachment to another coupling element (not shown):

FIG. 8 shows a coupling element structure 30 with flanges 30', 30" being tiltable relative to the structure 30 by movability over the partially spherical surface of the coupling element 30.

Figure 4B:
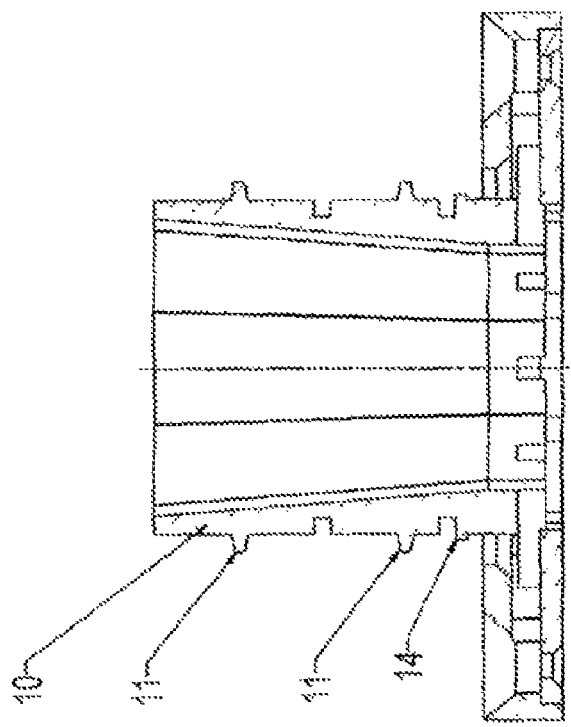
Figure 4A:
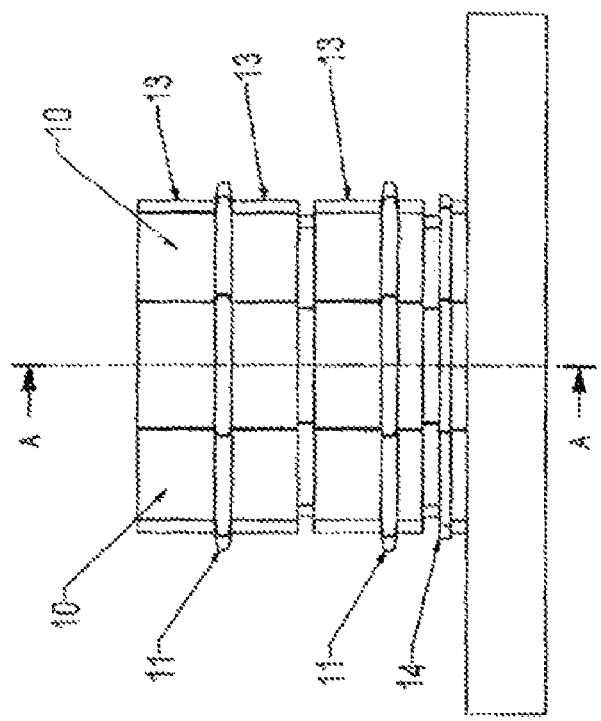
FIG. 4a is a side view of the tool.

The principle of the tool is shown on FIGS. 4a and 4b, whilst different applications of a cone shaped member 20, used as a mechanical force amplifier, fitted into the tool, to cause expansion of tool diameter to create beads in the pipe wall are shown in FIGS. 4-6.

The principle of the tool is shown in FIG. 5, whilst different embodiments of the cone used as a mechanical force amplifier are shown in FIGS. 6-8. FIG. 9 shows a tool with a hydraulic force amplifier.

During the development of the apparatus according to the invention, which comprises both an interior configuration of the external coupling element 2; 2' and the tool 10 which forms the beads 5, 6, it was quickly discovered that the most critical parameter for optimal attachment resides in the configuration of the parts 11, 11 of the tool that presses the beads 5, 6 out from the pipe and also a part 14 of the tool that is to prevent the end of the pipe 1 from tapering inwards during the pressing operation.

FIGS. 1*a*-1*d* show that an outermost portion 2' of the coupling element 2 against which pipe end 1' rests is flared outwards. This is to allow the tool to give the pipe end 1' an overbending outwards, which is necessary because the pipe end as mentioned, will otherwise tend to taper inwards. Thus, the pipe 1 will appear almost straight after the beads 5,6 have been pressed, as can be seen in the section shown in FIG. 1*d*.

The same basic interior configuration of the coupling elements will apply to a coupling element or collar intended for loose flanges, movable flanges as shown in FIG. 8, and other types which may be suitable for a same fastening method.

It should be mentioned that the cylindrical part of the coupling element 2; 2" as shown on FIGS. 1, 2 and 3 may advantageously be quite thin-walled. To a certain extent, the wall will then be resilient and yield a little during the pressing operation, and this will then mean that afterwards it is under inward tension and thus provides further pressure in the connection where the pipe 1 is in tension outwards.

Tests Laboratory tests carried out show that a mechanically goods seal is obtained between the grooves 3,4 and the beads 5,6. Nevertheless, it may be appropriate to insert a scaling material in one or more of the grooves.

Figure 3C:
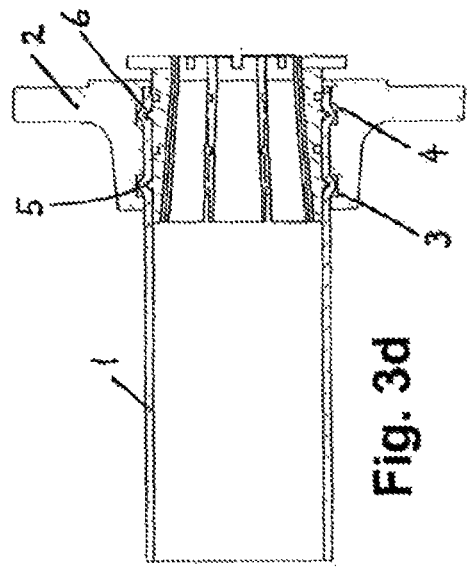
FIG. 3c shows a side view of the assembly shown in FIG. 3a in a second operational stage of the tool after coupling has been made thereby between the pipe and the coupling element.
Figure 3B:
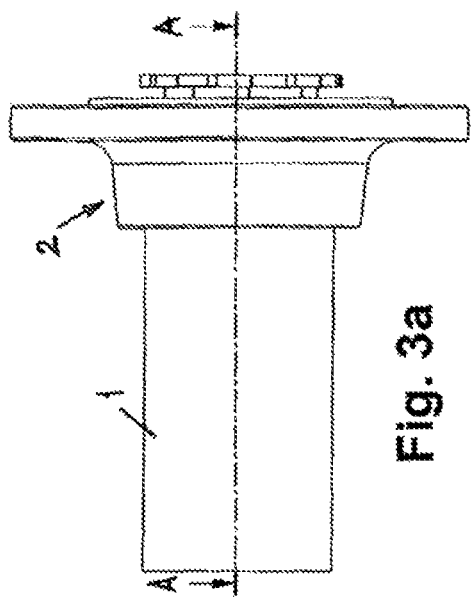
Figure 3D:
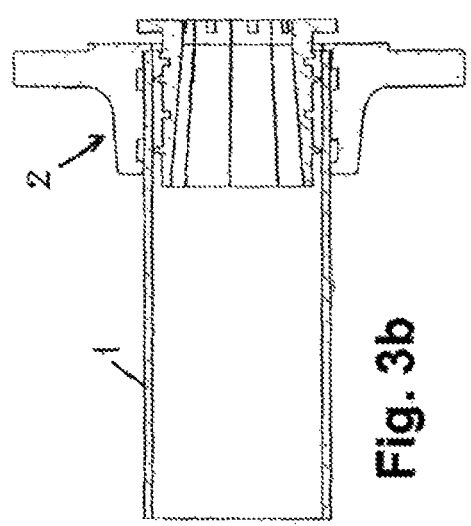
FIG. 3d shows a section B-B through the assembly of FIG. 3c.

According to FIGS. 4*a* and 4*b*, the principle of the tool is based on a plurality of segments 10 having circular segment ridges 11 intended for being pressed out towards the inside of the pipe wall and thus forming the beads 5, 6 first. Towards the end of the pressing operation, the cylindrical segment parts 13 of each of the segments forming a cylindrical assembly of segments is pressed against the inside of the pipe at the portions located sideways relative to the beads 5, 6 to prevent said portions from buckling inwards. This process is shown on FIGS. 3*a*-3*d* as well as on FIG. 9. FIGS. 3*a* and 3*b* show the pipe 1 and the coupling 2 before the pressing operation, and FIG. 9 is an enlarged view of an intermediate stage during the pressing where the aforementioned buckled-in areas 1" of the pipe sideways relative to the beads 5, 6 can be seen. In FIGS. 3*c* and 3*d* it is seen that the cylindrical parts 13 of the segments 10 have pressed the buckled-in areas 1" back towards the coupling element 2 so that they lie almost flush with the inside wall of the pipe and its diameter. This afterpressing gives a powerful radial tensioning effect in the pipe which increases the contact pressure between pipe 1 and coupling element 2, the sealing points between beads 5, 6 and grooves 3, 4, and prevents retraction of the pipe 1 as mentioned above when referring to plain ridges as previously described in, for example, DE 3144385. A projection 14 is located innermost on the segments 10, i.e. close to a tool element flange 21, said projection 14 intended to cause pressure against the end 1''' of the pipe, as indicated also on FIG. 9. In a corresponding portion of the coupling element 2 there is a recess 15 which may be made in the form of a bevel edge or a cut-out. This cut-out 15 can, for some uses, be partially filled with sealing material, or it may have an O-ring fitted therein. This special design of the tool and the coupling element has been found to be necessary in order to prevent the pipe from tapering or buckling inwards as previously mentioned.

The segments 10 and especially the ridges 11 are subjected to extremely large stresses during the pressing operation and are therefore made of hardened steel. Consequently large radial forces are also required to operate the segments 10. As an example thereof, the pressing of a connection between a coupling element 2 and a steel pipe 1 with an outer diameter of 76 mm and a wall thickness of 3.2 mm as shown on FIGS. 1*d*, 2*a* and 2*b* by using eight segments 10 would require a radial force per segment of about 200 kN, in total a required force of about 1600 kN. These are huge forces within a very narrow space, and the tool according to the invention therefore uses a power actuator located outside the pipe 1 combined with a force amplifier 20 inside the pipe 1.

Figure 5A:
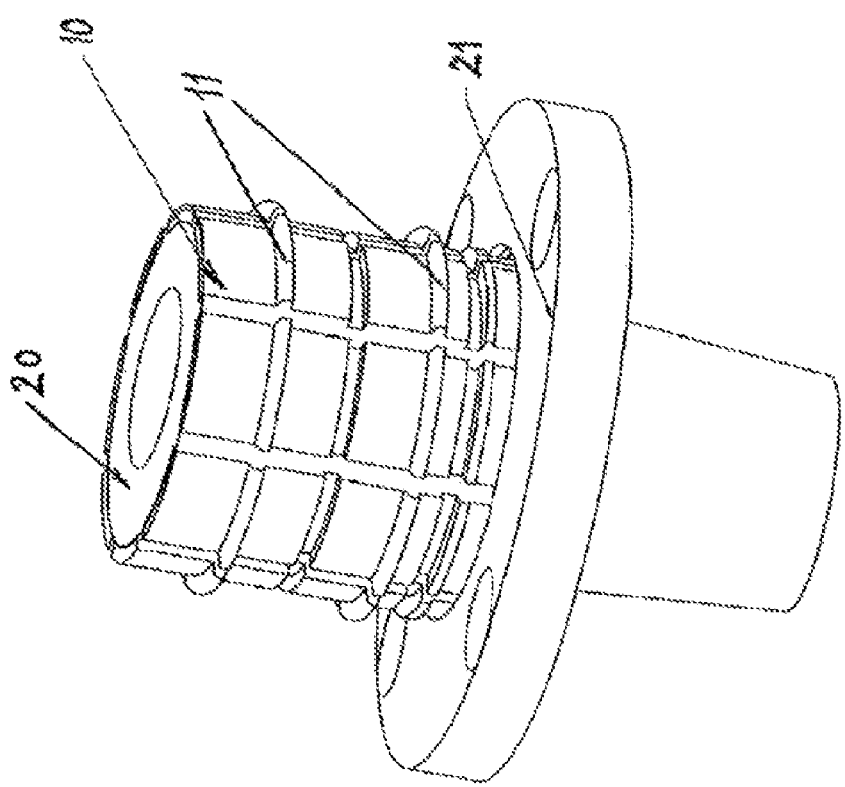
FIG. 5a is a perspective view of the tool from a first angle.

FIG. 5*a* shows the tool with segments 10 and with a circular cone 20 acting as force amplifier, FIG. 5*b* shows the tool with the cone 20 drawn in and the segments 10 in expanded position. FIG. 6 shows the same tool with a polygonal pyramid 20' acting as force amplifier.

FIGS. 7*a* and 7*b* show a tool with hydraulically operated segments 22. A segment 22 is shown separately and it can be seen that the segment 22 is fastened to a piston 27 which can move in a corresponding cylinder 28 in a housing N which is filled with oil. The segments 22 have circle sector ridges 23 to create beads. The illustrated tool has a total of eight pistons 27 and eight cylinders 28. When a rod 25 is pressed into the housing, the oil in the housing 24 will press the pistons 27 outwards. The greater the diameter of the piston 27 in relation to the diameter of the rod 25, the greater the force amplification. Reference numeral 21 denotes a tool attachment flange, the flange having a plurality of attachment holes 26.

A cold joining of the coupling element 2 to the pipe 1, in this manner, unlike, for example, welding, that the material of the coupling is not given a modified surface structure. Therefore, the invention is suitable for couplings as shown in FIGS. 8*a* and 8*b* where a coupling element 30 has an outer surface being part of a spherical surface, the coupling element 30 to be fastened to the pipe 1 and where a two-part flange has parts 30', 30" which can be joined to each other by screw action attachment, the two parts 30', 30" located on each side of the coupling element and facing one another. The flange with its flange parts 30', 30" will then be capable of being mounted at an angle which can be variably set relative to the pipe. The flange with its parts 30', 30" will either be freely movable, even after screwing the flange parts 30', 30" together, or will be such that it is locked to the coupling element 30 when the flange 30', 30" is tightened to another flange (not shown).

The invention claimed is:

1. A method for joining a coupling element to a pipe comprising,
   a) forming a coupling element with an annular portion for surrounding a pipe,
   b) providing the coupling element with a flange portion that extends radially from the annular portion,
   c) forming spaced annular grooves in an annular inner surface of the coupling element,
   d) forming an annular recess in the annular inner surface of the coupling element at a foremost portion of the coupling element with a recess diameter greater than the outer diameter of the pipe,
   e) positioning the coupling element on the pipe at an end region of the pipe such that the recess in the annular inner surface of the coupling element registers with the outer wall of the pipe at an open end of the pipe, the coupling element being positioned on the pipe separate and apart from any other pipe,
   f) providing a first and dedicated radially directed pressing action on the inside wall of the pipe, the pressing action corresponding to the location of the annular grooves in the surrounding coupling element, to deform the pipe at the annular grooves to create beads that project from the outside wall surface of the pipe into the annular grooves, g) providing a second and dedicated radially directed pressing action on the inside wall of the pipe at buckled-in-regions of the pipe wall that naturally occur between and adjacent the created beads during and caused by the first pressing action, to cause a post-pressing of said regions in the outward direction, thereby providing an outward tension on the pipe at the location of the coupling element and, h) enabling the second and dedicated radial post-pressing action to further press the end of the pipe radially outwards, slightly further than the diameter proper of the pipe, and thus by bending action thereon into the recess of the coupling element aligned with the end of the pipe, to flare the end of the pipe outwardly into the recess.

\* \* \* \* \*